(12) United States Patent
Hatfield et al.

(10) Patent No.: US 9,579,604 B2
(45) Date of Patent: Feb. 28, 2017

(54) BASE METAL ACTIVATED RHODIUM COATINGS FOR CATALYSTS IN THREE-WAY CATALYST (TWC) APPLICATIONS

(71) Applicant: Clean Diesel Technologies, Inc., Oxnard, CA (US)

(72) Inventors: Randal L. Hatfield, Port Hueneme, CA (US); Stephen J. Golden, Santa Barbara, CA (US); Johnny T. Ngo, Oxnard, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 14/732,523

(22) Filed: Jun. 5, 2015

(65) Prior Publication Data

US 2015/0352533 A1    Dec. 10, 2015

Related U.S. Application Data

(60) Provisional application No. 62/163,231, filed on May 18, 2015, provisional application No. 62/008,674, filed on Jun. 6, 2014.

(51) Int. Cl.
*B01J 23/00* (2006.01)
*B01J 23/02* (2006.01)
(Continued)

(52) U.S. Cl.
CPC ....... *B01D 53/9472* (2013.01); *B01D 53/945* (2013.01); *B01D 53/9454* (2013.01);
(Continued)

(58) Field of Classification Search
CPC ........ B01J 21/066; B01J 23/10; B01J 23/464; B01J 23/8906; B01J 23/894
(Continued)

(56) References Cited

U.S. PATENT DOCUMENTS

| 4,283,308 A | 8/1981 | Ohara et al. |
| 4,426,319 A | 1/1984 | Blanchard et al. |
| | (Continued) | |

FOREIGN PATENT DOCUMENTS

| DE | 29 28 249 | 1/1980 |
| EP | 2 308 595 | 4/2011 |
| | (Continued) | |

OTHER PUBLICATIONS

Hayes et al., "Introduction to Catalytic Combustion", pp. 310-313, 1997 OPA (Overseas Publishers Association).
(Continued)

*Primary Examiner* — Cam N. Nguyen
(74) *Attorney, Agent, or Firm* — Alston & Bird LLP

(57) ABSTRACT

Close-coupled catalysts (CCC) for TWC applications are disclosed. The novel CCCs are implemented using light-weighted ceramic substrates in which a thin coating employing a low loading of Iron (Fe)-activated Rhodium (Rh) material composition, with Iron loadings and an OSM of Ceria-Zirconia, are deposited onto the substrates. Different CCC samples are produced to determine and/or verify improved light-off (LO) and $NO_X$ conversion of the CCCs. Other CCC samples produced are a CCC including a standard (non-activated) Rh thin coating and a heavily loaded CCC with a single coating of Pd/Rh material composition. The CCC samples are aged under dyno-aging using the multi-mode aging cycle and their performance tested using a car engine with ports on the exhaust to measure the emissions, according to the testing protocol in the Environmental Protection Agency Federal Test Procedure 75. During testing, the thin coatings of Fe-activated Rh exhibit improved light-off and $NO_x$ conversion efficiency.

14 Claims, 3 Drawing Sheets

(51) Int. Cl.

| | | |
|---|---|---|
| *B01J 23/08* | (2006.01) | |
| *B01J 23/10* | (2006.01) | |
| *B01J 23/40* | (2006.01) | |
| *B01J 23/42* | (2006.01) | |
| *B01J 23/70* | (2006.01) | |
| *B01J 23/74* | (2006.01) | |
| *B01J 21/04* | (2006.01) | |
| *B01D 53/94* | (2006.01) | |
| *B01J 23/89* | (2006.01) | |
| *B01J 35/04* | (2006.01) | |
| *B01J 23/20* | (2006.01) | |
| *B01J 23/63* | (2006.01) | |
| *B01J 27/232* | (2006.01) | |
| *B01J 35/00* | (2006.01) | |

(52) U.S. Cl.
CPC ............. *B01J 21/04* (2013.01); *B01J 23/002* (2013.01); *B01J 23/10* (2013.01); *B01J 23/20* (2013.01); *B01J 23/63* (2013.01); *B01J 23/894* (2013.01); *B01J 23/8906* (2013.01); *B01J 27/232* (2013.01); *B01J 35/0006* (2013.01); *B01J 35/04* (2013.01); *B01D 2255/1023* (2013.01); *B01D 2255/1025* (2013.01); *B01D 2255/207* (2013.01); *B01D 2255/209* (2013.01); *B01D 2255/2042* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/20715* (2013.01); *B01D 2255/20738* (2013.01); *B01D 2255/40* (2013.01); *B01D 2255/902* (2013.01); *B01D 2255/908* (2013.01); *B01J 2523/00* (2013.01); *Y02T 10/22* (2013.01)

(58) Field of Classification Search
USPC ....... 502/302–304, 326, 327, 336, 338, 349, 502/355, 439
See application file for complete search history.

(56) References Cited

U.S. PATENT DOCUMENTS

| | | | |
|---|---|---|---|
| 4,629,472 A | 12/1986 | Haney, III et al. | |
| 4,868,148 A * | 9/1989 | Henk | B01D 53/945 423/213.5 |
| 4,891,050 A | 1/1990 | Bowers et al. | |
| 4,892,562 A | 1/1990 | Bowers et al. | |
| 4,923,842 A * | 5/1990 | Summers | B01D 53/945 502/261 |
| 5,024,824 A * | 6/1991 | Henk | B01D 53/945 423/213.5 |
| 5,034,020 A | 7/1991 | Epperly et al. | |
| 5,168,836 A | 12/1992 | Kraus | |
| 5,203,166 A | 4/1993 | Miller | |
| 5,266,083 A | 11/1993 | Peter-Hoblyn et al. | |
| 5,404,841 A | 4/1995 | Valentine | |
| 5,501,714 A | 3/1996 | Valentine et al. | |
| 5,535,708 A | 7/1996 | Valentine | |
| 5,584,894 A | 12/1996 | Peter-Hoblyn et al. | |
| 5,693,106 A | 12/1997 | Peter-Hoblyn et al. | |
| 5,732,548 A | 3/1998 | Peter-Hoblyn et al. | |
| 5,743,922 A | 4/1998 | Peter-Hoblyn et al. | |
| 5,749,928 A | 5/1998 | Epperly et al. | |
| 5,809,774 A | 9/1998 | Peter-Hoblyn et al. | |
| 5,809,775 A | 9/1998 | Tarabulski et al. | |
| 5,819,529 A | 10/1998 | Peter-Hoblyn et al. | |
| 5,868,421 A | 2/1999 | Eyrainer | |
| 5,921,080 A | 7/1999 | Ulmet et al. | |
| 5,924,280 A | 7/1999 | Tarabulski | |
| 5,939,354 A | 8/1999 | Golden | |
| 5,968,464 A | 10/1999 | Peter-Hoblyn et al. | |
| 5,976,475 A | 11/1999 | Peter-Hoblyn et al. | |
| 5,977,017 A | 11/1999 | Golden | |
| 6,003,303 A | 12/1999 | Peter-Hoblyn et al. | |
| 6,023,928 A | 2/2000 | Peter-Hoblyn et al. | |
| 6,051,040 A | 4/2000 | Peter-Hoblyn et al. | |
| 6,063,350 A | 5/2000 | Tarabulski et al. | |
| 6,124,130 A | 9/2000 | Olson | |
| 6,203,770 B1 | 3/2001 | Peter-Hoblyn et al. | |
| 6,279,603 B1 | 8/2001 | Czarnik et al. | |
| 6,352,955 B1 | 3/2002 | Golden | |
| 6,361,754 B1 | 3/2002 | Peter-Hoblyn et al. | |
| 6,372,686 B1 | 4/2002 | Golden | |
| 6,531,425 B2 | 3/2003 | Golden | |
| 6,948,926 B2 | 9/2005 | Valentine et al. | |
| 7,014,825 B2 | 3/2006 | Golden | |
| 7,473,288 B2 | 1/2009 | Toyoda et al. | |
| 7,527,776 B2 | 5/2009 | Golden et al. | |
| 7,641,875 B1 | 1/2010 | Golden | |
| 7,749,472 B2 | 7/2010 | Chen et al. | |
| 8,105,561 B2 * | 1/2012 | Hatanaka | B01D 53/945 422/111 |
| 8,323,601 B2 | 12/2012 | Justic et al. | |
| 8,545,780 B1 * | 10/2013 | Chen | B01D 53/945 423/213.2 |
| 8,569,198 B2 | 10/2013 | Hoshino et al. | |
| RE45,083 E * | 8/2014 | Kuno | B01J 23/10 423/213.2 |
| 8,802,582 B2 | 8/2014 | Malyala et al. | |
| 8,845,987 B1 | 9/2014 | Nazarpoor et al. | |
| 8,853,121 B1 | 10/2014 | Nazarpoor et al. | |
| 8,858,903 B2 | 10/2014 | Nazarpoor | |
| 8,906,330 B2 * | 12/2014 | Hilgendorff | B01D 53/945 423/213.5 |
| 9,011,784 B2 | 4/2015 | Golden et al. | |
| 9,012,353 B2 | 4/2015 | Golden et al. | |
| 9,216,410 B2 | 12/2015 | Hatfield | |
| 2001/0001354 A1 | 5/2001 | Peter-Hoblyn et al. | |
| 2002/0001554 A1 | 1/2002 | Czarnik et al. | |
| 2002/0042341 A1 | 4/2002 | Golden | |
| 2003/0109047 A1 | 6/2003 | Valentine | |
| 2003/0126789 A1 | 7/2003 | Valentine et al. | |
| 2003/0148235 A1 | 8/2003 | Valentine et al. | |
| 2003/0185722 A1 | 10/2003 | Toyoda | |
| 2003/0198582 A1 | 10/2003 | Golden | |
| 2004/0098905 A1 | 5/2004 | Valentine et al. | |
| 2004/0172876 A1 | 9/2004 | Sprague et al. | |
| 2005/0132674 A1 | 6/2005 | Toyoda et al. | |
| 2005/0160663 A1 | 7/2005 | Valentine | |
| 2005/0160724 A1 | 7/2005 | Valentine et al. | |
| 2005/0164139 A1 | 7/2005 | Valentine et al. | |
| 2005/0188605 A1 | 9/2005 | Valentine et al. | |
| 2005/0217751 A1 | 10/2005 | Valentine et al. | |
| 2006/0081922 A1 | 4/2006 | Golden | |
| 2006/0120936 A1 | 6/2006 | Alive et al. | |
| 2006/0166816 A1 | 7/2006 | Zhang et al. | |
| 2006/0228283 A1 | 10/2006 | Malyala et al. | |
| 2006/0254535 A1 | 11/2006 | Valentine et al. | |
| 2006/0260185 A1 | 11/2006 | Valentine et al. | |
| 2006/0276332 A1 | 12/2006 | Shore et al. | |
| 2007/0015656 A1 | 1/2007 | Valentine et al. | |
| 2007/0209272 A1 | 9/2007 | Valentine | |
| 2007/0283681 A1 | 12/2007 | Makkee et al. | |
| 2008/0038172 A1 | 2/2008 | Chen et al. | |
| 2008/0044330 A1 | 2/2008 | Chen et al. | |
| 2008/0210184 A1 | 9/2008 | Valentine et al. | |
| 2008/0219906 A1 | 9/2008 | Chen et al. | |
| 2008/0226524 A1 | 9/2008 | Alive et al. | |
| 2009/0004083 A1 | 1/2009 | Valentine et al. | |
| 2009/0257933 A1 | 10/2009 | Chen et al. | |
| 2009/0304566 A1 | 12/2009 | Golden et al. | |
| 2009/0324468 A1 * | 12/2009 | Golden | B01D 53/945 423/210 |
| 2009/0324469 A1 | 12/2009 | Golden et al. | |
| 2010/0124523 A1 * | 5/2010 | Chen | B01D 53/945 423/213.5 |
| 2010/0135879 A1 * | 6/2010 | Roesch | B01D 53/945 423/213.5 |

(56) References Cited

U.S. PATENT DOCUMENTS

| | | | |
|---|---|---|---|
| 2010/0212293 A1* | 8/2010 | Deeba | B01D 53/945 60/274 |
| 2010/0240525 A1 | 9/2010 | Golden et al. | |
| 2010/0316545 A1 | 12/2010 | Alive et al. | |
| 2010/0316547 A1 | 12/2010 | Justic et al. | |
| 2011/0239626 A1 | 10/2011 | Makkee et al. | |
| 2012/0088655 A1 | 4/2012 | Yabuzaki et al. | |
| 2012/0128557 A1 | 5/2012 | Nunan et al. | |
| 2012/0128558 A1 | 5/2012 | Nunan et al. | |
| 2012/0131911 A1* | 5/2012 | Nakagawa | B01D 53/945 60/299 |
| 2012/0183447 A1 | 7/2012 | Kwan et al. | |
| 2013/0115144 A1 | 5/2013 | Golden et al. | |
| 2013/0236380 A1 | 9/2013 | Golden et al. | |
| 2014/0271384 A1 | 9/2014 | Nazarpoor et al. | |
| 2014/0271387 A1 | 9/2014 | Nazarpoor | |
| 2014/0271388 A1 | 9/2014 | Nazarpoor et al. | |
| 2014/0271390 A1 | 9/2014 | Nazarpoor | |
| 2014/0271391 A1 | 9/2014 | Nazarpoor | |
| 2014/0271392 A1 | 9/2014 | Nazarpoor | |
| 2014/0271393 A1 | 9/2014 | Nazarpoor | |
| 2014/0271425 A1 | 9/2014 | Nazarpoor | |
| 2014/0274662 A1 | 9/2014 | Nazarpoor | |
| 2014/0274663 A1 | 9/2014 | Nazarpoor | |
| 2014/0274674 A1 | 9/2014 | Nazarpoor et al. | |
| 2014/0274675 A1 | 9/2014 | Nazarpoor | |
| 2014/0274677 A1 | 9/2014 | Nazarpoor | |
| 2014/0274678 A1 | 9/2014 | Nazarpoor | |
| 2014/0298714 A1 | 10/2014 | Sprague | |
| 2014/0301906 A1 | 10/2014 | Hatfield | |
| 2014/0301909 A1* | 10/2014 | Nazarpoor | B01D 53/945 422/177 |
| 2014/0301926 A1 | 10/2014 | Hatfield | |
| 2014/0301931 A1 | 10/2014 | Nazarpoor | |
| 2014/0302983 A1 | 10/2014 | Nazarpoor | |
| 2014/0323294 A1* | 10/2014 | Nagao | B01J 23/34 502/304 |
| 2014/0334978 A1 | 11/2014 | Hatfield | |
| 2014/0334989 A1 | 11/2014 | Nazarpoor et al. | |
| 2014/0334990 A1 | 11/2014 | Nazarpoor | |
| 2014/0335625 A1 | 11/2014 | Hatfield | |
| 2014/0335626 A1 | 11/2014 | Hatfield | |
| 2014/0336038 A1 | 11/2014 | Nazarpoor et al. | |
| 2014/0336044 A1 | 11/2014 | Nazarpoor et al. | |
| 2014/0336045 A1 | 11/2014 | Nazarpoor et al. | |
| 2014/0356243 A1 | 12/2014 | Nazarpoor | |
| 2014/0357475 A1 | 12/2014 | Nazarpoor et al. | |
| 2014/0357479 A1 | 12/2014 | Nazarpoor et al. | |
| 2014/0360164 A1 | 12/2014 | Sprague et al. | |
| 2014/0364303 A1 | 12/2014 | Hatfield | |
| 2014/0369912 A1* | 12/2014 | Zheng | B01J 23/63 423/213.5 |
| 2015/0004709 A1 | 1/2015 | Nazarpoor | |
| 2015/0005157 A1 | 1/2015 | Nazarpoor et al. | |
| 2015/0005158 A1 | 1/2015 | Nazarpoor | |
| 2015/0005159 A1 | 1/2015 | Nazarpoor et al. | |
| 2015/0017082 A1 | 1/2015 | Nazarpoor | |
| 2015/0018202 A1 | 1/2015 | Nazarpoor et al. | |
| 2015/0018203 A1 | 1/2015 | Nazarpoor et al. | |
| 2015/0018204 A1 | 1/2015 | Nazarpoor et al. | |
| 2015/0018205 A1 | 1/2015 | Nazarpoor et al. | |
| 2015/0031268 A1 | 1/2015 | Waites et al. | |
| 2015/0050742 A1 | 2/2015 | Nazarpoor | |
| 2015/0051067 A1 | 2/2015 | Nazarpoor et al. | |
| 2015/0093300 A1* | 4/2015 | Arnold | B01J 37/0246 422/180 |
| 2015/0105242 A1 | 4/2015 | Nazarpoor et al. | |
| 2015/0105243 A1 | 4/2015 | Nazarpoor et al. | |
| 2015/0105245 A1 | 4/2015 | Nazarpoor et al. | |
| 2015/0105246 A1 | 4/2015 | Nazarpoor et al. | |
| 2015/0105247 A1 | 4/2015 | Nazarpoor et al. | |
| 2015/0139883 A1* | 5/2015 | Notestein | B01J 23/83 423/263 |
| 2015/0147239 A1 | 5/2015 | Launois et al. | |
| 2015/0147251 A1 | 5/2015 | Nazarpoor et al. | |
| 2015/0148215 A1 | 5/2015 | Nazarpoor | |
| 2015/0148216 A1 | 5/2015 | Nazarpoor et al. | |
| 2015/0148220 A1 | 5/2015 | Nazarpoor | |
| 2015/0148222 A1 | 5/2015 | Nazarpoor | |
| 2015/0148223 A1 | 5/2015 | Nazarpoor et al. | |
| 2015/0148224 A1 | 5/2015 | Nazarpoor et al. | |
| 2015/0148225 A1 | 5/2015 | Nazarpoor et al. | |
| 2015/0182951 A1 | 7/2015 | Nazarpoor et al. | |
| 2015/0182954 A1 | 7/2015 | Nazarpoor et al. | |
| 2015/0196902 A1 | 7/2015 | Golden et al. | |
| 2015/0238940 A1 | 8/2015 | Nazarpoor et al. | |
| 2015/0238941 A1 | 8/2015 | Nazarpoor et al. | |
| 2015/0258496 A1 | 9/2015 | Hatfield et al. | |
| 2015/0290627 A1 | 10/2015 | Nazarpoor et al. | |
| 2015/0290630 A1 | 10/2015 | Nazarpoor et al. | |
| 2015/0316524 A1 | 11/2015 | Hatfield | |
| 2015/0352494 A1 | 12/2015 | Hatfield et al. | |
| 2015/0352529 A1 | 12/2015 | Nazarpoor et al. | |
| 2015/0352531 A1 | 12/2015 | Hatfield et al. | |
| 2015/0352532 A1 | 12/2015 | Hatfield et al. | |
| 2015/0352533 A1 | 12/2015 | Hatfield et al. | |
| 2016/0023188 A1 | 1/2016 | Nazarpoor et al. | |
| 2016/0030885 A1 | 2/2016 | Hatfield | |
| 2016/0047751 A1 | 2/2016 | Pless et al. | |
| 2016/0082422 A1 | 3/2016 | Nazarpoor et al. | |
| 2016/0121304 A1 | 5/2016 | Nazarpoor et al. | |
| 2016/0121308 A1 | 5/2016 | Nazarpoor et al. | |
| 2016/0121309 A1 | 5/2016 | Nazarpoor et al. | |
| 2016/0136617 A1 | 5/2016 | Nazarpoor et al. | |
| 2016/0136618 A1 | 5/2016 | Nazarpoor et al. | |
| 2016/0136619 A1 | 5/2016 | Nazarpoor et al. | |
| 2016/0136620 A1 | 5/2016 | Nazarpoor et al. | |
| 2016/0136621 A1 | 5/2016 | Nazarpoor et al. | |

FOREIGN PATENT DOCUMENTS

| | | |
|---|---|---|
| WO | WO 90/07561 | 7/1990 |
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/085876 A1 | 11/2001 |
| WO | WO 03/068363 A1 | 8/2003 |
| WO | WO 2004/058641 A1 | 7/2004 |
| WO | WO 2009/139860 A1 | 11/2009 |
| WO | WO 2011/068509 A1 | 6/2011 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |

OTHER PUBLICATIONS

International Search Report and Written Opinion for corresponding International Application No. PCT/IB2016/052877, dated Jul. 26, 2016.

International Search Report and Written Opinion for corresponding International Application No. PCT/US2015/034538, dated Aug. 26, 2015.

* cited by examiner

BASE METAL ACTIVATED RHODIUM COATINGS FOR CATALYSTS IN THREE-WAY CATALYST (TWC) APPLICATIONS

CROSS-REFERENCE TO RELATED APPLICATIONS

This application claims the benefit of U.S. application Ser. No. 62/008,674, filed Jun. 6, 2014, and U.S. application Ser. No. 62/163,231, filed May 18, 2015, each of which are hereby incorporated by reference in their entireties.

BACKGROUND

Field of the Disclosure

The present disclosure relates generally to catalyst materials for reducing engine exhaust emissions, and more particularly, to improved close-coupled catalysts for three-way catalyst (TWC) applications.

Background Information

Current automotive catalysts largely depend on platinum group metals (PGM) (e.g., Platinum, Palladium, and Rhodium) in order to convert vehicle emissions to less noxious substances. However, the supply of said metals is limited even as automobile production increases as a larger portion of the world population adopts motorized vehicles for transport. Additionally, environmental concerns have led to ever more stringent $NO_X$, hydrocarbon (HC), and particulate emission regulations being adopted in countries throughout the world. As such, there is a continuing need for catalysts able to provide better catalytic performance while maintaining reasonable use of PGM. One way of improving the light-off performance of a TWC close-coupled catalyst is to reduce its heat capacity per unit which can be accomplished by reducing the mass of the substrate by decreasing its wall thickness or increasing its porosity. Unfortunately, employing thinner or more porous walls can create a problematic reduction in the mechanical strength of the substrate.

Accordingly, there is a continuing need to provide TWC close-coupled catalysts capable of providing sufficient conversion so that stringent HC, $NO_X$ and particulates emission limits can be accomplished cost-effectively.

SUMMARY

The present disclosure describes the effects that result from different three-way catalyst (TWC) material compositions including light-weighted ceramic substrates in which a single coating of Iron (Fe)-activated Rhodium (Rh) is applied to the substrates to enable performance synergies with low loadings of platinum group metals (PGM) material compositions within conventional TWC systems. Further, the present disclosure describes improved light-off catalytic behavior and steady-state conversion efficiency for cumulative emissions, specifically nitrogen oxide ($NO_X$), for close-coupled catalysts (CCCs) employing Fe-activated Rh, in comparison with the catalytic behavior of conventional CCCs including standard ceramic substrates in which coatings of PGM employ heavy loadings of material compositions that are applied onto the standard ceramic substrate.

In some embodiments, samples of a CCC, herein referred as CCC Type 1A catalyst samples, are produced including a suitable light-weighted ceramic substrate in which a thin coating of Fe-activated Rh is applied onto the suitable light-weighted ceramic substrate, for a total loading of about 90 g/L. In these embodiments, the produced samples of CCC Type 1A catalyst sample comprise deposition layers including Rh and iron (Fe) supported on an oxygen storage material (OSM) composition including Ceria (Ce), Zirconia (Zr), Neodymia (Nd), Praseodymia (Pr), Yttria (Y), or combinations thereof, amongst others. Further to these embodiments, Rh and Fe loadings can vary within a range from about 1 g/ft$^3$ to about 20 g/ft$^3$ for Rh and about 1 wt % to about 20 wt % for Fe. Still further to these embodiments, the produced samples of CCC Type 1A catalyst sample include Rh loadings of about 3 g/ft$^3$ and Fe loadings of about 7.37 wt %. Examples of OSM include Ceria-Zirconia mixed oxide with fluorite phases, other mixed oxides including Ceria, and other Ceria-containing materials including additional oxides. In these embodiments, samples of CCC Type 1A includes a thin coating of Fe activated Rh employing a loading of about 3 g/ft$^3$. In some embodiments, the aforementioned CCC samples produced are aged at about 1000° C. for about 20 hours under dyno-aging using the multi-mode aging cycle on a bench reactor.

In other embodiments, samples of a CCC, herein referred as CCC Type 1C catalyst samples, are produced including a suitable light-weighted ceramic substrate in which a thin coating of Fe activated Rh is applied onto the suitable light-weighted ceramic substrate, for a total loading of about 90 g/L. In these embodiments, the produced samples of CCC Type 1C comprise deposition layers including Rh and iron (Fe) supported on an oxygen storage material (OSM) composition including Ceria, Zirconia, Neodymia, Praseodymia, Yttria, or combinations thereof, amongst others. Further to these embodiments, Rh and Fe loadings can vary within a range from about 1 g/ft$^3$ to about 20 g/ft$^3$ for Rh and from about 1 wt % to about 20 wt % for Fe. Still further to these embodiments, the produced samples of CCC Type 1C include Rh loadings of about 0.38wt % and Fe loadings of about 7.37 wt %. Examples of OSM include Ce—Zr mixed oxide with fluorite phases, other mixed oxides including Ce, and other Ce-containing materials including additional oxides. In these embodiments, samples of CCC Type 1C includes a thin coating of Fe-activated Rh employing a loading of about 9.8 g/ft3

In some embodiments, samples of a CCC, herein referred as CCC Type 1B catalyst samples, are produced including a thin coating of non-activated (standard) Rh deposited onto a suitable light-weighted ceramic substrate. In these embodiments, Rh loading of about 9.8 g/ft$^3$ is employed to produce the catalyst samples.

In other embodiments, samples of a standard CCC, herein referred as CCC Type 2 catalyst samples, are produced including a ceramic substrate in which a coating of PGM based coating is deposited onto the ceramic substrate. In these embodiments, a multi-layer coating of Palladium (Pd)/Rh, with total load of about 300 g/L is deposited onto the ceramic substrate. In some embodiments, the aforementioned CCC samples produced are aged at about 950° C. for about 50 hours under dyno-aging using the multi-mode aging cycle.

In some embodiments, $NO_X$ conversion efficiencies for CCC Type 1A and CCC Type 1B catalyst samples are compared after an isothermal light-off test at a temperature of 350° C. and space velocities within a range from about 20,000 hr-$^1$ to about 180,000 hr-$^1$, according to an embodiment.

In other embodiments, CCC sample testing for CCC Type 1B, CCC Type 1C, CCC Type 2 catalyst samples is conducted using a car engine with ports located on the exhaust to measure the emissions, according to the testing protocol in the Environmental Protection Agency Federal Test Procedure 75 (FTP-75), using a vehicle speed profile established for the dyno drive cycle. In these embodiments, the results measured during FTP-75 test are compared to verify improved performance levels of the CCC Type 1C catalyst sample versus the CCC Type 1B catalyst sample and the standard CCC Type 2 catalyst sample. Further to these embodiments, the effect of the single coating of Fe-activated Rh on NOx conversion is analyzed and determined by comparing the cumulative grams of $NO_X$ emissions, measured downstream at the tail pipe, associated with the CCC Type 1C, CCC Type 1B, and the standard CCC Type 2 catalyst samples.

The CCC system includes a thin coating of Fe-activated Rh employing a loading of about 3 $g/ft^3$ to about 9.8 $g/ft^3$ and further employing loadings of Fe with Ce—Zr OSM and outperforms the other catalysts when their respective light-off and performance are compared. These results enable potential benefits, such as, for example reduced costs, improved $NO_x$ conversion, etc. when implemented within a plurality of TWC system applications.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
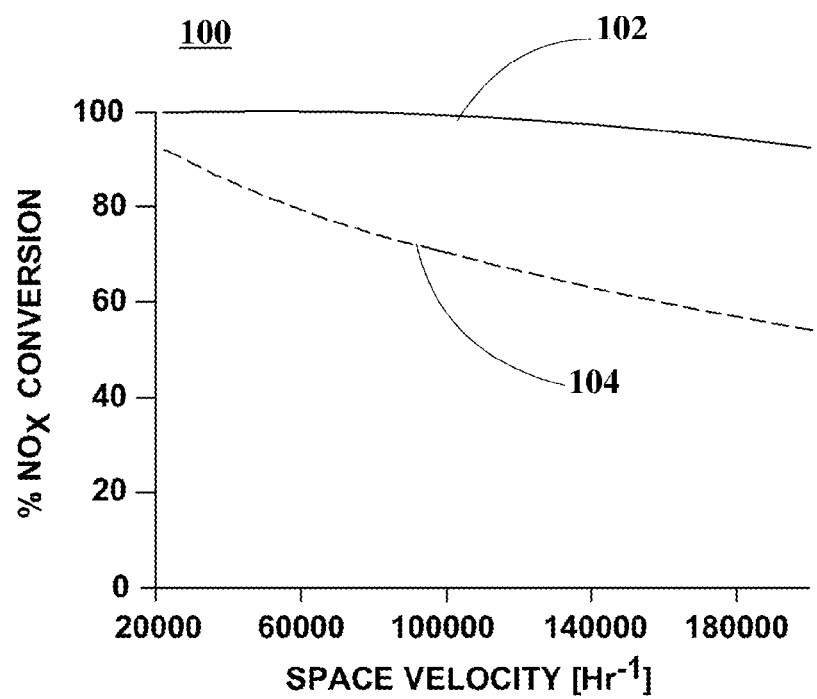
FIG. 1 is a graphical representation illustrating comparison of isothermal light-off (LO) test results for $NO_X$ conversion associated with a catalyst sample including a light-weight substrate employing a single coating of 3 $g/ft^3$ of Iron (Fe)-activated Rhodium (Rh) loading and a catalyst sample including a single coating of 9.8 $g/ft^3$ of standard Rh loading, according to an embodiment.

The present disclosure is described herein in detail with reference to embodiments illustrated in the drawings, which form a part hereof. Other embodiments may be used and/or other modifications may be made without departing from the scope or spirit of the present disclosure. The illustrative embodiments described in the detailed description are not meant to be limiting of the subject matter presented.

Definitions

As used here, the following terms have the following definitions:

"Air to fuel ratio, or A/F ratio, or AFR" refers to the mass ratio of air to fuel present in a combustion process.

"Catalyst" refers to one or more materials that may be of use in the conversion of one or more other materials.

"Catalytic converter" refers to a vehicle emissions control device that converts toxic pollutants in exhaust gas to less toxic pollutants by catalyzing a redox reaction (oxidation or reduction).

"Catalyst system" refers to any system including a catalyst, such as, a PGM catalyst or a ZPGM catalyst of at least two layers comprising a substrate, a washcoat and/or an overcoat.

"Close-coupled catalyst" refers to a catalyst located in close proximity to the exhaust manifold of the engine and reduces cold-engine emissions.

"Conversion" refers to the chemical alteration of at least one material into one or more other materials.

"Conversion efficiency" refers to the percentage of emissions passing through the catalyst that are converted to their target compounds.

"Federal Test Procedure 75 or FTP-75" refers to a city driving cycle during which a series of tests defined by the US Environmental Protection Agency (EPA) are conducted to measure tailpipe emissions and fuel economy of passenger cars.

"Lean condition" refers to an exhaust gas condition with an R-value less than 1 and having excess oxidants.

"Light off" refers to the time elapsed from an engine cold start to the point of 50 percent pollutant conversion.

"Oxygen storage material (OSM)" refers to a material that absorbs oxygen from oxygen rich gas flows and further able to release oxygen into oxygen deficient gas flows.

"Platinum group metals (PGM)" refers to platinum, palladium, ruthenium, iridium, osmium, and rhodium.

"R-value" refers to the value obtained by dividing the total reducing potential of the gas mixture (in moles of Oxygen) by the total oxidizing potential of the gas mixture (in moles of Oxygen).

"Rich condition" refers to an exhaust gas condition with an R-value greater than 1 and having excess reductants.

"Stoichiometric condition" refers to an exhaust gas condition with an R-value equal to 1.

"Substrate" refers to any material of any shape or configuration that yields a sufficient surface for depositing a washcoat layer and/or an overcoat layer.

"Support oxide" refers to porous solid oxides, typically mixed metal oxides, which are used to provide a high surface area which aids in oxygen distribution and exposure of catalysts to reactants such as $NO_x$, CO, and hydrocarbons.

"Three-Way Catalyst (TWC)" refers to a catalyst able to perform the three simultaneous tasks of reduction of nitrogen oxides to nitrogen and oxygen, oxidation of carbon monoxide to carbon dioxide, and oxidation of unburnt hydrocarbons to carbon dioxide and water.

Description of the Disclosure

The present disclosure is directed to three-way catalyst (TWC) material compositions including light-weighted ceramic substrates in which a single, thin layer coating of Fe-activated Rhodium (Rh) is applied to the substrates to enable performance synergies with lower loadings of platinum group metals (PGM) material compositions within conventional TWC systems. Further, the present disclosure describes improved light-off catalytic behavior and steady-state conversion efficiency for cumulative emissions, specifically nitrogen oxide ($NO_X$), for close-coupled catalysts (CCCs) including Fe-activated Rh. The improved light-off catalytic behavior and steady-state conversion efficiency for cumulative emissions are measured in comparison with the light-off catalytic behavior of conventional CCCs including coatings of PGM employing heavy loadings of material compositions that are applied onto ceramic substrates.

As used herein, and as an illustrative example, loading of a washcoat is the mass of washcoat deposited on a substrate divided by a catalyst system volume. Loading of an overcoat or a component of the washcoat or the overcoat has a corresponding meaning about the weight of that layer or component divided by the volume of the catalyst system. As shown in Example 3.1 of R. E. Hayes and Stan T. Kolaczkowski, *Introduction to Catalytic Combustion*, 310-313 (1997), a washcoat loading divided by the fraction of the volume of a reactor that is taken up by the washcoat is equal to the density of the washcoat, confirming the usage. In more detail, the washcoat area divided by the total area of a reactor produces a fraction equivalent to the volume of the washcoat divided by the volume of the reactor (in the example, 0.112). Dividing the loading of the washcoat (in the example, 170 g/L), by the aforementioned fraction, equals the weight of the washcoat divided by the volume of the washcoat, or the washcoat density. Consequently, the washcoat loading, (in the example, 170 g/L), equals the mass of the washcoat divided by the volume of the washcoat. Accordingly, washcoat loading is the mass of washcoat deposited on the substrate divided by the catalyst system volume. As recognized by persons of ordinary skill in the art, expressing loading as a concentration refers to the mass of the loaded component or layer divided by the volume of a catalyst system.

Production of Close-Coupled Catalyst Samples

The present disclosure includes TWC systems employing CCC samples to determine the effect of using Fe-activated Rh coatings deposited onto light-weight ceramic substrates In some embodiments, a CCC sample, herein referred to as CCC Type 1A catalyst sample, including a Fe-activated Rh coating that is deposited onto a light-weight substrate is produced. In these embodiments, the substrate employed has dimensions of about 4.66" diameter, 3.58" length, 600 cells per square inch (CPSI), and 2.75 mil wall thickness. The deposition layer includes suitable loadings of Fe-activated Rh and suitable loadings of Iron (Fe), and a suitable oxygen storage material (OSM) composition, such as, for example Ceria (Ce), Zirconia (Zr), Neodymia (Nd), Praseodymia (Pr), Yttria (Y) mixed oxide, amongst others. Further to these embodiments, the deposition layer includes Fe-activated Rh loadings with a combined weight-percentage ranging from about 1 wt % to about 20 wt % of Fe. Still further to these embodiments, the catalyst sample of CCC Type 1A includes an Fe-activated Rh loading of about 3 g/ft$^3$ Rh, an Fe loading of about 7.37 wt %, and the OSM for the remaining amount. In these embodiments, the OSM includes a Ceria-Zirconia mixed oxide with fluorite phases. Further to these embodiments, other OSMs are used including Ceria, or other Ceria-containing materials that may include additional oxides. In these embodiments, a total loading of about 90 g/L (approximately, 2548 g/ft$^3$) is achieved with Fe-activated Rh loading of about 3 g/ft$^3$, Fe loading of about 215 g/ft$^3$, and OSM for the remaining amount.

In other embodiments, a CCC sample, herein referred to as CCC Type 1C catalyst sample, including a Fe-activated Rh coating that is deposited onto a light-weight substrate is produced. In these embodiments, the substrate has similar dimension as the substrate used for CCC Type 1A, and the deposition layer includes suitable loadings of Fe-activated Rh and suitable loadings of Iron (Fe), and a suitable oxygen storage material (OSM) composition, such as, for example Ceria (Ce)-Zirconia (Zr)-Neodymia (Nd)-Praseodymia (Pr)-Yttria (Y) mixed oxide, amongst others. Further to these embodiments, the deposition layer includes Fe-activated Rh loadings with a combined weight-percentage ranging from about 1 wt % to about 20 wt % of Fe. Still further to these embodiments, the catalyst sample of CCC Type 1C includes a Fe-activated Rh loading of about 0.38 wt %, an Fe loading of about 7.37 wt %, and the OSM for the remaining amount. In these embodiments, the OSM includes a Ceria-Zirconia mixed oxide with fluorite phases. Further to these embodiments, other OSMs are used including Ceria, or other Ceria-containing materials that may include additional oxides. In these embodiments, a total loading of about 90 g/L (approximately, 2548 g/3) is achieved with Fe-activated Rh loading of about 9.8 g/ft$^3$, Fe loading of about 215 g/ft3, and OSM for the remaining amount.

In some embodiments, a CCC samples herein referred as CCC Type 1B catalyst sample, is produced. In these embodiments, the substrate has similar dimension as the substrate used for CCC Type 1A, and the CCC Type 1B catalyst sample includes a standard Rh coating deposited onto a suitable light-weight ceramic substrate. Further to these embodiments, a standard Rh loading of about 9.8 g/ft$^3$ is employed to produce the Type 1B catalyst samples with a total loading of about 90 g/L. In these embodiments, the CCC Type 1B catalyst sample includes substantially similar OSM as CCC Type 1A and CCC Type 1C catalyst samples.

In other embodiments, a sample of a conventional CCC, herein referred as a CCC Type 2 catalyst sample, is produced. In these embodiments, the CCC Type 2 catalyst sample includes a ceramic substrate on which a coating of platinum group metals (PGM) loadings is deposited. Further to these embodiments, a multi-layer coating of Palladium (Pd)/Rh, with a total loading of about 300 g/L (approximately, 8495 g/ft$^3$), is deposited onto the ceramic substrate. In these embodiments, the s coating of Pd/Rh includes loading of about 50 g/ft$^3$ Pd and about 9.8 g/ft$^3$ Rh. Further to these embodiments, CCC Type 2 catalyst samples include OSM and Alumina for the remaining amount.

Aging of Close-Coupled Catalyst Samples

In some embodiments, as described in FIG. 1, the CCC Type 1A catalyst samples produced are aged at approximately 1000° C. for about 20 hours employing dyno-aging methodology and using the multi-mode aging cycle on an engine. In these embodiments and during the aging cycle, temperatures are monitored.

Figure 2:
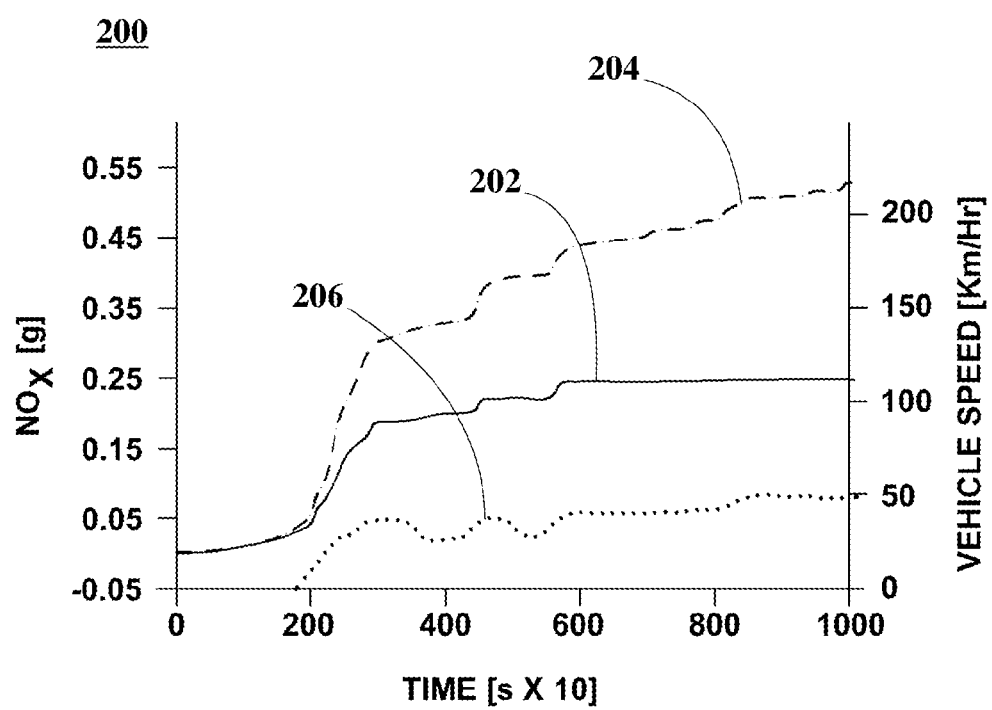
FIG. 2 is a graphical representation illustrating the cumulative $NO_X$ measurements obtained during the implementation of the Federal Test Procedure (FTP)-75 protocol to test catalyst samples including Fe-activated Rh and standard Rh loadings of about 9.8 $g/ft^3$ and 9.8 $g/ft^3$, respectively, according to an embodiment.
Figure 3:
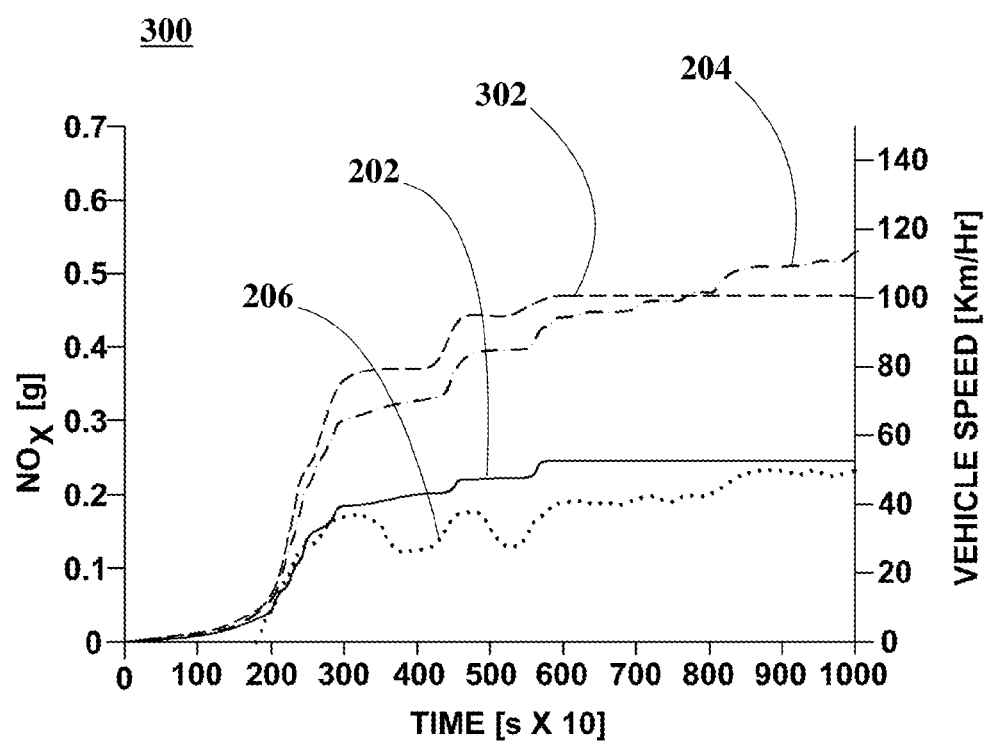
FIG. 3 is a graphical representation illustrating the cumulative $NO_X$ measurements obtained during the implementation of the FTP-75 protocol to test catalyst samples including Fe-activated Rh and standard Rh loadings of about 9.8 $g/ft^3$ and 9.8 $g/ft^3$, respectively, as well as a standard catalyst sample including a multi-layer coating of Palladium (Pd)/Rh with a total loading of about 300 g/L, according to an embodiment.

In other embodiments, as described in FIGS. 2 to 3, CCC Type 1B, CCC Type 1C and CCC Type 2 catalyst samples produced are aged at approximately 950° C. for about 50 hours employing dyno-aging methodology and using the multi-mode aging cycle on an engine. In these embodiments and during the aging cycle, temperatures are monitored.

Test Methodology

In some embodiments, testing of the CCC samples is conducted using a car engine that includes ports added to the exhaust of the car engine to measure engine emissions according to the testing protocol requirements within the Environmental Protection Agency Federal Test Procedure75 (FTP-75), using a vehicle speed profile established for the dyno drive cycle. In these embodiments, a single roll chassis dynamometer is employed to conduct the FTP-75 tests. Further to these embodiments, the engine emissions that are continuously measured during the FTP-75 tests are compared to determine/verify improved performance levels of CCC Type 1C, CCC Type 1B, and conventional CCC Type 2 catalyst samples. In these embodiments, the effect of the single, thin coating of Fe-activated Rh is analyzed/determined by comparing the cumulative grams of $NO_X$ conversion that is measured downstream at the tail pipe for CCC Type 1C, CCC Type 1B, and conventional CCC Type 2 catalyst samples.

Performance of Fe-Activated Rh Thin Coatings

FIG. 1 is a graphical representation illustrating comparison of isothermal light-off (LO) test results for $NO_X$ conversion associated with a catalyst sample including a lightweight substrate employing a single, thin coating of 3 g/ft$^3$ of Fe-activated Rh (CCC Type 1A) and a catalyst sample including a single coating of 9.8 g/ft$^3$ of standard Rh loading (CCC Type 1B), according to an embodiment. In FIG. 1, the isothermal LO tests were performed at a temperature of 350° C. and space velocities within a range from about 20,000 hr-$^1$ to about 180,000 hr-$^1$. In FIG. 1, conversion performance 100 includes conversion curve 102 and conversion curve 104.

In some embodiments, conversion curve 102 illustrates $NO_X$ conversion associated with a CCC Type 1A catalyst sample. In these embodiments, conversion curve 104 illustrates $NO_X$ conversion associated with a CCC Type 1B catalyst sample. Further to these embodiments, the catalytic activity of the CCC Type 1A and CCC Type 1B catalyst samples employed in FIG. 1 vary over the range of space velocities employed during the testing. In these embodiments, the CCC Type 1A catalyst sample exhibits a greater $NO_X$ conversion performance than the CCC type 1B catalyst sample. Further to these embodiments, the CCC Type 1A catalyst sample exhibits a stable catalytic behavior of about 100% $NO_X$ conversion within a range of space velocities from about 20,000 hr$^{-1}$ to about 100,000 hr$^{-1}$, while the CCC Type 1B catalyst sample exhibits a continuous decrease in $NO_X$ conversion (from about 90% to about 75% $NO_X$ conversion) within the same range of space velocities.

In these embodiments, for increasing space velocities within a range from about 100,000 hr$^{-1}$ to about 180,000 hr$^{-1}$, the CCC Type 1A catalyst sample maintains a significantly high $NO_X$ conversion percentage rate within a slightly decreasing range from about 99% to 95%. Further to these embodiments, for increasing space velocities within a range from about 100,000 hr$^{-1}$ to about 180,000 hr$^{-1}$, the CCC Type 1B catalyst sample continues to exhibit a decreasing $NO_X$ conversion percentage rate within a range from about 75% to about 67%. In FIG. 1, a thin coating including an Fe-activated Rh loading of about 3 g/ft$^3$ combined with Fe loadings, as previously described for a CCC Type 1A catalyst sample, exhibits a greater performance in $NO_X$ percentage conversion rate than a thin coating with a loading of 9.8 g/ft$^3$ of standard Rh only, a CCC Type 1B catalyst sample.

FIG. 2 is a graphical representation illustrating the accumulation of total $NO_X$ emissions obtained during the first 100 seconds of implementation of the Federal Test Procedure (FTP)-75 test protocol to test catalyst samples including Fe-activated Rh (CCC Type 1C) and standard Rh (CCC Type 1B) loadings of about 9.8 g/ft$^3$ and 9.8 g/ft$^3$, respectively, according to an embodiment. In FIG. 2, FTP-75 test results 200 include accumulation curve 202, accumulation curve 204, and vehicle speed curve 206.

In some embodiments, accumulation curve 202 illustrates total $NO_X$ accumulation associated with CCC Type 1C catalyst samples. In these embodiments, accumulation curve 204 illustrates total $NO_X$ accumulation associated with CCC Type 1B catalyst samples. Further to these embodiments, vehicle speed curve 206 illustrates the vehicle speed profile used during the implementation of the FTP-75 test protocol for testing the aforementioned CCC samples.

In some embodiments, the results measured during the FTP-75 test protocol are compared and verify that thin coatings including low loadings of Fe-activated Rh provide improved $NO_X$ conversion performance levels versus standard Rh applications. In these embodiments, the effects of the thin coatings including low loadings of Fe-activated Rh on $NO_X$ accumulation are analyzed during all cycles of the FTP-75 test protocol to verify improvements in $NO_X$ conversion efficiency. Further to these embodiments, the effects of the thin coatings including low loadings of Fe-activated Rh on $NO_X$ conversion are verified by comparing the accumulated grams of $NO_X$ for CCC Type 1C catalyst samples with the accumulated grams of $NO_X$ for CCC Type 1B catalyst samples, measured downstream at the tail pipe.

In these embodiments, it is observed in FIG. 2 that the accumulation of $NO_X$ emissions after the gas stream exits both CCCs are substantially similar, at a level of about 0.025 accumulated grams of $NO_X$, during the first 20 seconds of the FTP-75 test cold start. Further to these embodiments, it is further observed in FIG. 2 that the accumulation of $NO_X$ emissions after the gas stream exits both CCCs during the FTP-75 test post the 20 seconds time mark results in the accumulation of significantly more grams of $NO_X$ emissions associated with accumulation curve 204 as compared to the accumulation of grams of $NO_X$ emissions associated with accumulation curve 202. In these embodiments, CCC Type 1C catalyst samples including thin coatings employing low loadings of Fe-activated Rh exhibit improved $NO_X$ conversion as compared to CCC Type 1B catalyst samples including standard Rh applications.

FIG. 3 is a graphical representation illustrating the accumulation of total $NO_X$ emissions obtained during the implementation of the FTP-75 test protocol to test catalyst samples including Fe-activated Rh (CCC Type 1C) and standard Rh (CCC Type 1B) loadings of about 9.8 g/ft$^3$ and 9.8 g/ft$^3$, respectively, as well as a standard catalyst sample including a multi-layer coating of Pd/Rh (CCC Type 2) with a total loading of about 300 g/L, according to an embodiment. In FIG. 3, FTP-75 test results 300 include accumulation curve 202, accumulation curve 204, vehicle speed curve 206, and accumulation curve 302.

In some embodiments, accumulation curve 202 illustrates $NO_X$ accumulation associated with CCC Type 1C catalyst samples. In these embodiments, accumulation curve 204 illustrates $NO_X$ accumulation associated with CCC Type 1B catalyst samples. Further to these embodiments, accumulation curve 302 illustrates $NO_X$ accumulation associated with CCC Type 2 catalyst samples. Still further to these embodiments, vehicle speed curve 206 illustrates the vehicle speed profile used during the implementation of the FTP-75 test protocol for testing the aforementioned CCC samples. In FIG. 3, elements having identical element numbers from previous figures perform in a substantially similar manner.

In some embodiments, the results measured during the FTP-75 test protocol are compared and verify that thin coatings including low loadings of Fe-activated Rh provide improved $NO_X$ conversion performance levels when compared to standard Rh applications as well as a standard catalyst samples employing multi-layer coatings of Pd/Rh. In these embodiments, the effects of the thin coatings including low loadings of Fe-activated Rh on $NO_X$ accumulation are analyzed during all cycles of the FTP-75 test protocol to verify improvements in conversion efficiency. Further to these embodiments, the effects of the thin coatings including low loadings of Fe-activated Rh on $NO_X$ conversion are verified by comparing the accumulated grams of $NO_X$ for the CCC Type 1C catalyst samples with the accumulated grams of NO$_X$ for CCC Type 1B catalyst samples and with the accumulated grams of NO$_X$ for CCC Type 2 catalyst samples, measured downstream at the tail pipe.

In these embodiments, it is observed in FIG. 3 that the accumulation of NO$_X$ emissions after the gas stream exits the CCCs are substantially similar, at a level of about 0.025 accumulated grams of NO$_X$, during the first 20 seconds of the FTP-75 test cold start. Further to these embodiments, it is further observed in FIG. 3 that the accumulation of NO$_X$ emissions after the gas stream exits all three CCCs during the FTP-75 test post the 20 seconds time mark results in the accumulation of more grams of NO$_X$ emissions associated with accumulation curve 204 and accumulation curve 302 as compared to the accumulation of grams of NO$_X$ emissions associated with accumulation curve 202. In these embodiments, during the post 20 seconds time mark portion of the FTP-75 test protocol, the heavily loaded CCC Type 2 catalyst samples exhibit a lower performance of NO$_x$ conversion as compared to the NO$_x$ conversion performance of the CCC Type 1B catalyst samples. Still further to these embodiments, during the FTP-75 test post the 200 s time mark both CCC Type 2 and CCC Type 1B catalyst samples exhibit a NO$_x$ conversion performance that is significantly lower than the NO$_x$ conversion performance exhibited by the CCC Type 1C catalyst sample, which maintains a stable conversion efficiency throughout the entire light-off portion of the FTP-75 test procedure.

In other embodiments and in the third part (Bag 3) of the FTP-75 test procedure (not shown), the CCC Type 2 catalyst samples exhibit improved Bag 3 performance. However, even with extra Pd the CCC Type 2 catalyst samples exhibit a lower light-off performance than the CCC Type 1B catalyst samples as CCC Type 2 catalyst samples have about three times the coating mass of CCC Type 1B catalyst samples. In these embodiments, the accumulation of NO$_x$ emissions during the FTP-75 test procedure, illustrated in FIG. 3, indicates CCC Type 1C catalyst samples exhibit stable performance and conversion efficiency when compared to CCC Type 1B and CCC Type 2 catalyst samples. The CCC system including a thin coating employing low loadings of Fe-activated Rh of about 9.8 g/3 and further including loadings of Fe with Ce—Zr OSM outperforms other catalysts (e.g., CCC Type 1B and CCC Type 2 catalyst samples) when their respective light-off and FTP-75 test procedure performances are compared. These results enable potential benefits, such as, for example reduced costs, improved NO$_x$ conversion, etc. when implemented within a plurality of TWC system applications.

What is claimed is:

1. A catalytic system comprising: a ceramic substrate coated with Fe-activated Rh at a loading of about 90 g/L.

2. The catalytic system of claim 1, wherein the Fe-activated Rh is supported on a OSM comprising one selected from the group consisting of Cc, Zr, Nd, Pr, Y, and combinations thereof.

3. The catalytic system of claim 1, wherein the Fe is present at about 7% (w/w).

4. The catalytic system of claim 1, wherein the Rh is present at less than about 0.5% (w/w).

5. A catalytic system comprising:
a ceramic substrate coated with Fe-activated Rh;
wherein the Rh loadings are from about 1 g/ft$^3$ to about 20 g/ft$^3$ and the Fe loadings are from about 1 g/ft$^3$ to about 20 g/ft$^3$; and
wherein the Fe-activated Rh is supported on a OSM.

6. The catalytic system of claim 5, wherein the Rh loadings are about 3 g/ft$^3$.

7. The catalytic system of claim 5, wherein the Fe loadings are less than about 7 g/ft$^3$.

8. The catalytic system of claim 5, wherein the Fe is present at about 7% (w/w).

9. The catalytic system of claim 5, wherein the Rh is present at less than about 0.5% (w/w).

10. The catalytic system of claim 5, wherein the OSM comprising one selected from the group consisting of Ce, Zr, Nd, Pr, Y, and combinations thereof.

11. The catalytic system of claim 5, wherein the OSM comprising a Ce—Zr oxide.

12. The catalytic system of claim 5, wherein the OSM comprising a Ce—Zr oxide having a fluorite phase.

13. The catalytic system of claim 5, wherein the Fe-activated Rh is applied at a loading of less than about 10 g/ft$^3$.

14. The catalytic system of claim 5, wherein the Fe-activated Rh is applied at a loading of greater than about 3 g/ft$^3$.

* * * * *